United States Patent [19]

Pentesco

[11] Patent Number: 4,753,559
[45] Date of Patent: Jun. 28, 1988

[54] EXPANSION SHELL

[75] Inventor: Walter J. Pentesco, St. Catharines, Canada

[73] Assignee: Seneca (St. Catherines) Manufacturing Ltd., Ontario, Canada

[21] Appl. No.: 39,814

[22] Filed: Apr. 14, 1987

Related U.S. Application Data

[63] Continuation of Ser. No. 751,403, Jul. 3, 1985, abandoned.

[30] Foreign Application Priority Data

Oct. 19, 1984 [CA] Canada ................... 465848

[51] Int. Cl.⁴ ............................................. F16B 13/06
[52] U.S. Cl. ...................................... 411/61; 411/72; 405/259
[58] Field of Search ................ 411/15, 24, 25, 26, 411/27, 28, 38, 44, 45, 47, 55, 56, 57, 60, 61, 63, 64, 67, 71-74; 405/259-261

[56] References Cited

U.S. PATENT DOCUMENTS

| | | | |
|---|---|---|---|
| 725,278 | 4/1903 | Newton | 411/61 |
| 1,372,035 | 3/1921 | Ogden | 411/61 |
| 1,487,292 | 3/1924 | Tomanson | 411/61 |
| 2,324,142 | 7/1943 | Eklund | 411/38 X |
| 2,762,119 | 9/1956 | Jackson | 411/61 X |
| 2,878,709 | 3/1959 | Horvath | . |
| 3,134,289 | 5/1964 | Dickow | . |
| 3,181,414 | 5/1965 | Pickow | 411/72 X |
| 3,200,693 | 8/1965 | Dickow | 411/57 X |
| 3,250,170 | 5/1966 | Siegel | . |
| 3,381,567 | 5/1968 | Askey | 411/72 X |
| 3,969,976 | 7/1976 | Amico | . |
| 4,100,834 | 7/1978 | Harris | . |
| 4,194,858 | 3/1980 | Evans | 405/259 |
| 4,260,122 | 4/1981 | Fiala | 248/71 |
| 4,278,006 | 7/1981 | Lobello | 411/47 |
| 4,287,807 | 9/1981 | Pacharis et al. | 411/42 |
| 4,289,426 | 9/1981 | Chaiko | 405/259 |

FOREIGN PATENT DOCUMENTS

| | | |
|---|---|---|
| 211834 | 5/1921 | Canada . |
| 661424 | 4/1963 | Canada . |
| 870345 | 5/1971 | Canada . |
| 936027 | 10/1973 | Canada . |
| 937792 | 12/1973 | Canada . |
| 946190 | 4/1974 | Canada . |
| 1029221 | 4/1978 | Canada . |
| 1110091 | 10/1981 | Canada . |
| 1136910 | 12/1982 | Canada . |

OTHER PUBLICATIONS

Brochure received from the Technology Information Division, Canada Centre for Mineral and Energy Technology, Department of Energy, Mines and Resources, Ottawa, Canada; 1980.
Beerbower, W. B., "Resin Rock Bolting in Coal"; Cox, R. M., A Comparative Evaluation of Rock Bolt Anchors; Scott, J. J.; Friction Rock Stabilizers-A New Rock Method; all being pre-print proceedings of the 17th U.S. Symposium on Rock Mechanics held at Snowbird, Utah, Aug. 25-27, 1976; pp. 5E3-1 to 5E3-3, pp. 5E4-1 to 5E4-5, pp. 5E5-1 to 5E5-8, respectively.

Primary Examiner—Neill R. Wilson
Attorney, Agent, or Firm—Beveridge, DeGrandi and Weilacher

[57] ABSTRACT

An expansion shell is formed from a single piece of sheet metal consisting of two spade-shaped leaves connected by a narrow portion which becomes the bail. The leaves are corrugated along their transverse axes so as to form a series of undulations of increasing amplitude and the leaves are formed into semi-cylinders. The corrugated semi-cylindrical leaves are centrally slotted along their longitudinal axes so as to form four leaf segments. The corrugated leaf segments are then compressed along their longitudinal axes so as to cause the undulations to form a tapered pleated metal fold, wherein the crests of the undulations become semi-cylindrical ridges capable of gripping the rock formation.

2 Claims, 3 Drawing Sheets

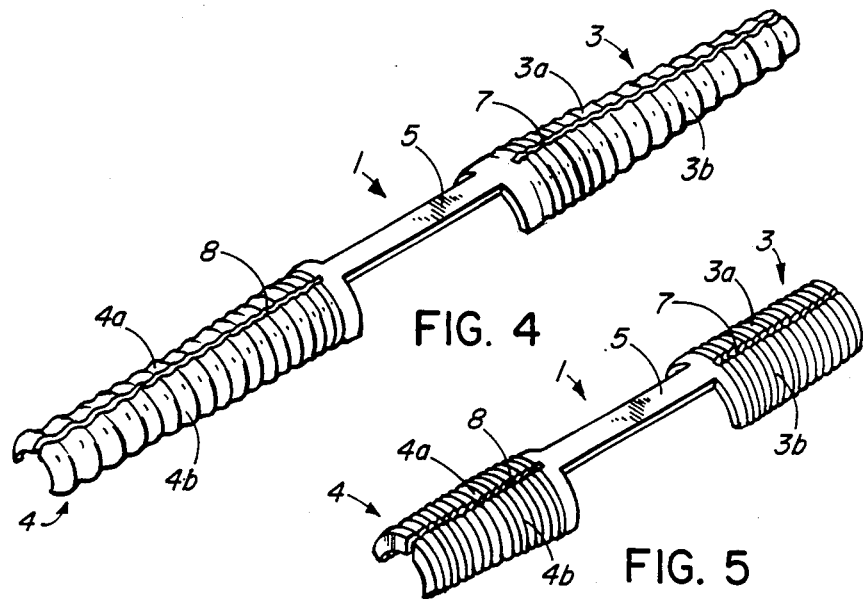
FIG. 4
FIG. 5
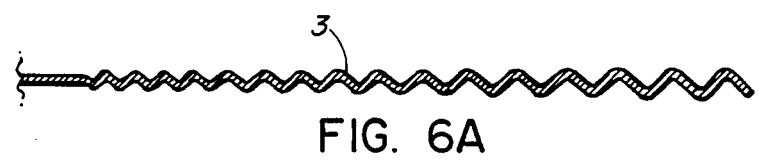
FIG. 6A
FIG. 6B
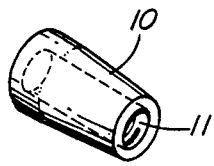
FIG. 8
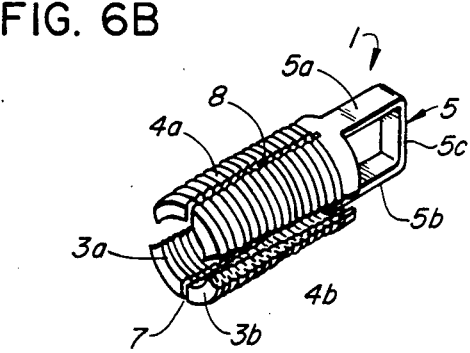
FIG. 7

EXPANSION SHELL

This application is a continuation of application Ser. No. 751,403, filed July 3, 1985, now abandoned.

BACKGROUND DISCUSSION

In underground operations where the rock in the roof and walls is too weak to stand alone, it must be supported. Rock bolting has found increasing application in drift and other types of openings to hold the rock structure together, to reinforce strata, and to stabilize the structure by holding key pieces of rock in place. The use of rock bolts enables the tunnels to be kept clear of obstructions so as to more easily permit the use of heavy mechanized equipment.

A rock bolt is a threaded steel rod provided with means for anchoring in a pre-drilled bore hole in the rock. The anchoring of the bolts is effected by an expansion shell which has been inserted into the bore holes and through the wedge of which the bolts are threaded. As the bolt is threaded, the expansion shell is caused to expand so as to firmly grip the wall of the bore holes. A plate or other retainer can then be pulled against the rock with a nut on the threaded bolt.

A number of patents have been addressed to expansion shells and methods of making the same.

Canadian Pat. No. 211,834 discloses the method of forming an expansion shell from sheet metal by a simple punching or stamping process. All but the upper surface of the blank is corrugated on diagonal lines. The blank is then rolled around a central axis into a tapered tube. The thickness of the walls is increased by folding the metal along a longitudinal fold line together near the smaller part of the tapered member.

Canadian Pat. No. 661,424 discloses a mine roof bolt expanding shell comprising two semi-cylindrical sections connected by a bridging strap, wheren each section is slotted centrally from the upper end to provide a pair of segments. Expansion in four radial directions is thus allowed, so that a more circumferential grip results. The exterior of the segments uses circumferentially extending and axially-space gripping teeth.

Canadian Pat. Nos. 1,029,221 and 1,110,091 and U.S. Pat. No. 3,250,170 disclose forming an expansion shell from a single piece of sheet metal by first cutting it to form two spade-shaped pieces connected by a narror portion which later becomes the bail.

Canadian Pat. No. 870,345 discloses a method of making expansion shells from generally planar sheet metal. An expansion shell having a plurality of toothed fingers disposed in a generally tubular configuration is formed from a uniform sheet of steel.

SUMMARY OF THE INVENTION

The present invention relates to expansion shells, and in particular to expansion shells of the type used to anchor a bolt for support of a mine roof. The unitary bolt expansion shell is of generally cylindrical shape, comprising a pair of semi-cylindrical leaves with an outer gripping surface of a plurality of circumferential, approximately transverse, ridges, these being the crests of a pleated metal fold which is tapered toward the proximal ends of the leaves and is progressively thicker toward the distal end of the leaves, and a bail connecting the leaves.

The present invention further relates to such an expansion shell of generally cylindrical shape formed from sheet metal, comprising a pair of separate semi-cylindrical leaves having an outer gripping surface of a plurality of circumferential transverse ridges, these ridges being the crests of a pleated metal fold, and a bail connecting the leaves.

The present invention further relates to a method of making a bolt expansion shell, comprising the steps of forming an planar metal blank consisting of two leaves connected by a central portion at the proximal ends thereof, corrugating each leaf along an approximately transverse axis to form a series of undulations such that the corrugations continuously increase in amplitude towards the distal ends of the leaves, bending each leaf along a longitudinal axis to semi-cylindrical form, applying an axially directed force to collapse the undulations of the leaves to form a tapered pleated metal fold, and bending the central portion connecting the leaves to form the bail of the expansion shell.

The present invention further relates to such a method of making a bolt expansion shell, comprising the steps of forming a planar metal blank consisting of two leaves connected by a central portion at the proximal ends thereof, corrugating each of the leaves along a transverse axis to form a series of undulations such that the corrugations continuously increase in amplitude toward the distal ends of the leaves, bending each of the leaves along a longitudinal axis to a semi-cylindrical form, applying an axially directed force to cause the series of undulations to become a tapered pleated metal fold, and bending the central portion connecting the leaves to form a bail.

The present invention further relates to such a method of making a bolt expansion shell, comprising the steps of forming a planar metal blank consisting of two leaves connected by a central narrow portion at the proximal ends thereof, corrugating each of the leaves along a transverse axis to form a series of undulations such that the corrugations continuously increase in amplitude towards the distal ends of the leaves, longitudinally slotting each of the leaves, bending the leaves along a longitudinal axis to semi-cylindrical form concentric with a bolt axis, applying axially directed force to the leaves to collapse the undulations of the leaves to form a tapered pleated metal fold, and bending the central narrow portion connecting the leaves to a substantially U-shape so as to have the central narrow portion from the bail of the expansion shell.

In the preferred embodiment, the expansion shell with four leaf segments is capable of expanding in four radial directions so that a more nearly circumferential grip results, of providing greater initial contact with the walls, and of allowing the shell to more quickly achieve its final holding configuration. The unitary construction of the leaves and bail helps to ensure that the bail does not slip sideways before the leaves have anchored, as may occur if a bail is loosely fastened to the leaves. The pleated fold construction causes the semi-cylindrical ridges which are the gripping surface to resist flattening under pressure.

BRIEF DESCRIPTION OF THE DRAWINGS

FIG. 4 depicts the corrugated semi-cylindrical leaves having longitudinal slots formed centrally therein.

FIG. 5 depicts the corrugations of increasing amplitude having been formed into a tapered pleated metal fold.

FIG. 6A depicts the cross-section of a leaf of the shell depicted in FIG. 4.

FIG. 6B depicts the cross-section of a leaf of the shell depicted in FIG. 5.

FIG. 7 depicts the completed expansion shell, wherein the connecting metal portion becomes the bail.

FIG. 8 depicts the tapered expansion plug having an axial threaded aperture capable of receiving a threaded roof bolt.

DETAILED DISCLOSURE

The preferred embodiment of the invention will now be described in detail.

Figure 1:
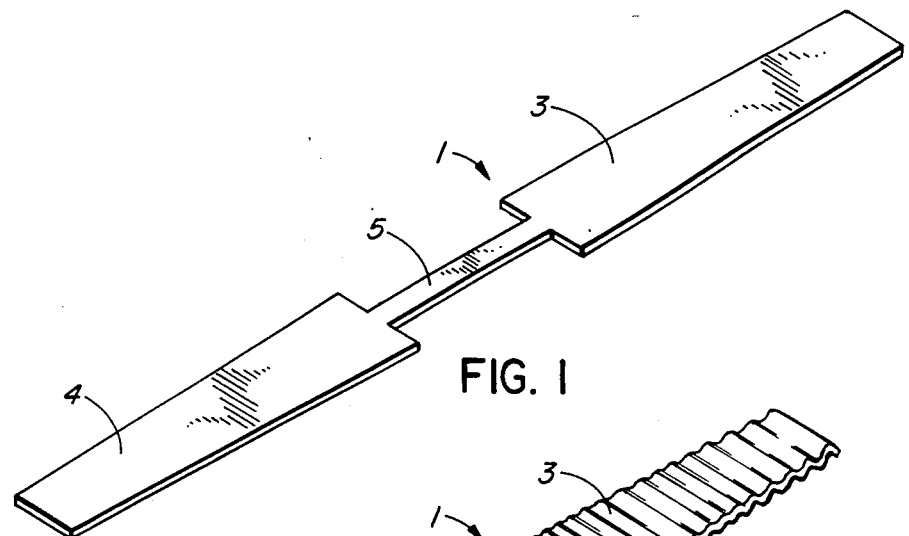
FIG. 1 depicts the integral unitary planar metal blank from which the expansion shell is made.

The planar metal blank 1 depicted in FIG. 1 is formed from sheet metal of substantially uniform thickness by a mechanical operation such as punching. The sheet metal is preferably a strip of commercially available flat rolled steel. The use of steel in the manufacture of expansion shells is advantageous because steel leaves are much stronger than the cast iron leaves commonly used in expansion shells and therefore are less likely to break off, bend in over the plug, or misalign in such a manner that one of the leaves does not catch on the wall.

The metal blank 1 comprises a pair of like opposed leaves 3 and 4 connected by narrow portion 5 at the proximal ends of the leaves. The leaves 3 and 4 are of a generally rectangular shape but are narrower towards the distal extremities thereof, so as to be spade-shaped.

Figure 2:
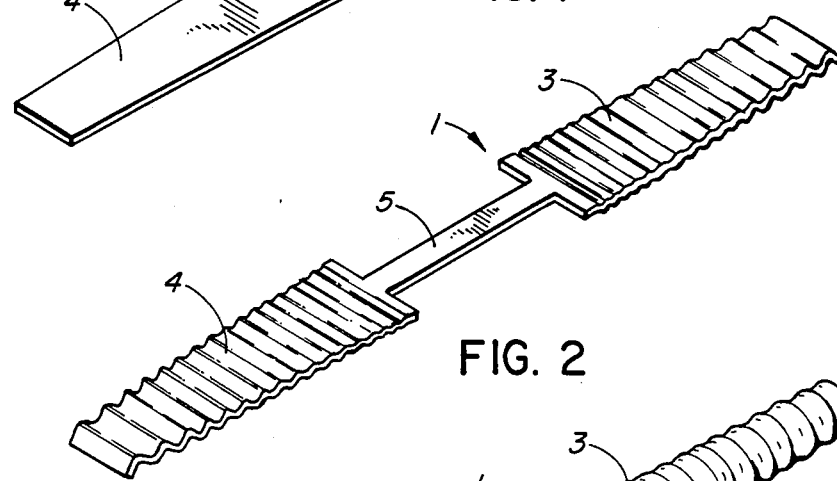
FIG. 2 depicts the metal blank having corrugations of increasing amplitude along a transverse axis of the leaves.

The leaves 3 and 4 are corrugated, by means of a forming die, along a transverse axis so as to form a series of undulations across most of the length of the leaf (FIG. 2). The undulations continuously increase in amplitude toward the distal end of each spade-shaped leaf.

Figure 3:
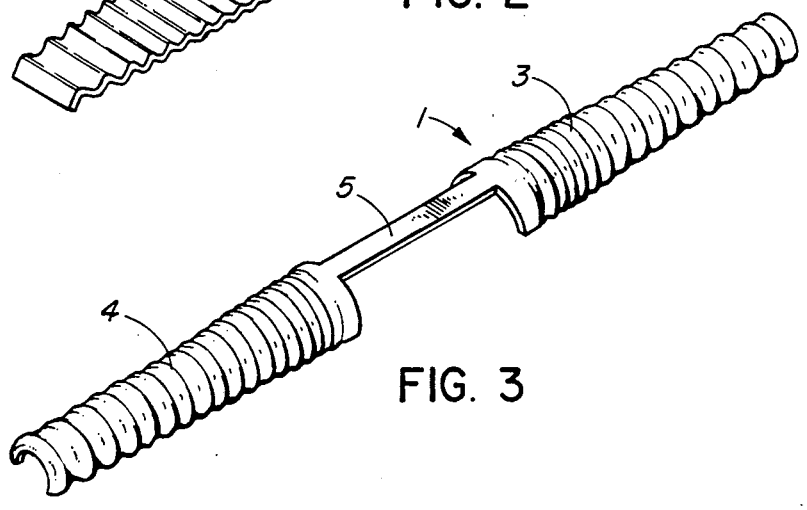
FIG. 3 depicts the corrugated leaves formed into semi-cylinders.

The slotted corrugated leaves 3 and 4 are each bent by a die along a longitudinal axis into a semi-cylindrical form which is concentric with the axis of the bolt (FIG. 3).

The corrugated leaves 3 and 4 are then longitudinally slotted, by means of a punch die, from the distal end of the leaf across the central portion of the leaf to form, respectively, leaf segments 3a and 3b and leaf segments 4a and 4b. As illustrated in FIG. 4, slot 7 of leaf 3 and slot 8 of leaf 4 extend the full length of the corrugated portion of each leaf, but the slot may extend along only part of the corrugated length of the leaf.

A force is then applied by a cam action die along the longitudinal axis of leaf segments 3a, 3b and 4a, 4b so as to compress the metal and form a pleated metal fold, wherein the crest of each undulation forms a circumferential semi-cylindrical ridge (FIG. 5). Because of the increasing amplitude of the undulations, it is seen that in cross-section the pleated metal fold is tapered toward the proximal ends of leaves 3 and 4 and is progressively thicker toward the distal ends of leaves 3 and 4. FIG. 6A depicts the cross-section of a leaf after the corrugations of increasing amplitude have been formed, as in FIG. 4, and FIG. 6B depicts the cross-section of the same leaf after the pleated metal fold has been formed, as in FIG. 5.

The integral unit 1 is not bent over a die at the bail action so that the connecting portion 5 forms a square U-shaped bail having bail portion 5c substantially perpendicular to bail portions 5a and 5b. The completed expansion shell is depicted in FIG. 7. The unitary construction of the leaves and bail helps to ensure that the bail does not slip sideways before the leaves have anchored, as may occur if a bail is loosely fastened to the leaves.

A conventional conical expansion plug 10 with axial threaded aperture 11 capable of receiving a threaded roof bolt, is used as a wedging means for expanding the shell. The expansion plug 10, made from bar steel, is shown in FIG. 8. The upper portion of expansion plug 10 is wider than the cylindrical space defined by leaves 3 and 4, so that as torque is applied to the roof bolt the expansion plug is forced toward bail 5, causing leaf segments 3a, 3b and 4a, 4b to expand radially. The slotted leaves allow for expansion in four radial directions so that a more complete circumferential grip results. The use of slotted leaves also provides for greater initial contact with the walls (at four points), and allows the shell to more quickly achieve the final holding configuration because the leaves are capable of opening more easily.

The partly circumferential semi-cylindrical ridges which grip the rock formation provide an increasing circumferential grip against the wall formation as the expansion plug is inserted. The use of a series of small semi-cylindrical ridges assists the leaves to better grip the wall formation by not crushing the walls of the hole in soft formations and by spreading the load over the entire leaf area. Because the semi-cylindrical ridges are the gripping surface of a pleated fold construction, the ridges resist flattening under the pressure caused as expansion plug 10 moves towards bail 5.

Figure 9A:
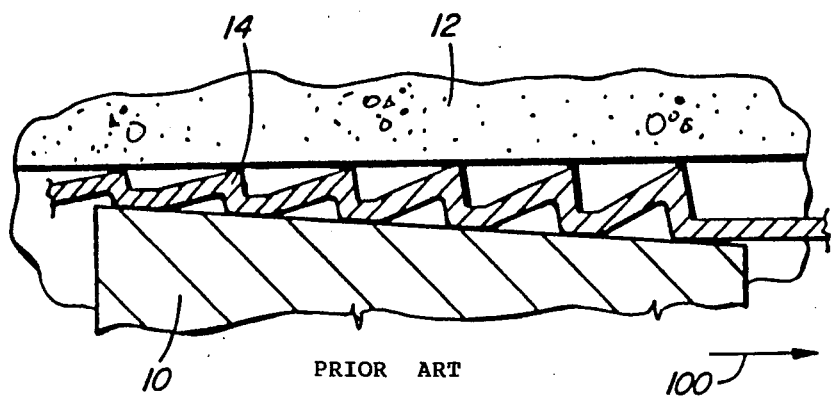
FIG. 9A depicts a known expansion shell in use.
Figure 9B:
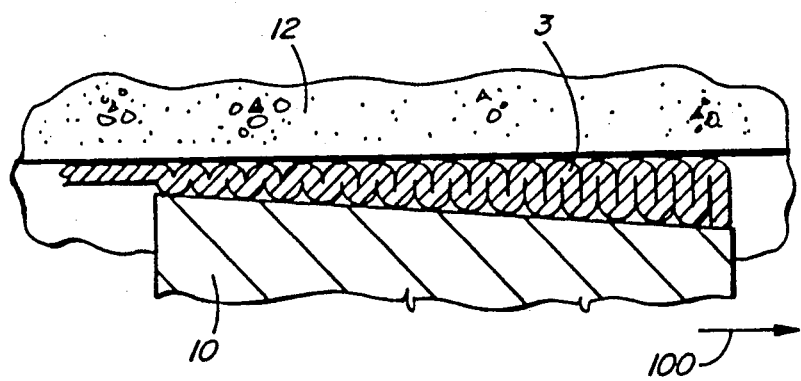
FIG. 9B depicts the expansion shell of the invention in use.

FIG. 9A depicts a known expansion shell, similar to that of Canadian Pat. Nos. 870,345 and 1,029,221 (supra), in use. It is seen that as plug 10 moves in the direction of arrow 100, leaf 14 between plug 10 and rock 12 tends to collapse. FIG. 9B depicts the present expansion shell in use. The pleated metal fold of expansion leaf 3 will remain rigid and will not exhibit a tendency to collapse as plug 10 moves in the direction of arrow 100 and wedges leaf 3 between itself and rock 12.

In a test of the expansion shell that is the invention, a 1¼ inch diameter hole was drilled into a concrete slab simulating a rock hole. An expansion shell and tapered plug on a 5/8-11 threaded rod were inserted into the hole. Torque was exerted on the threaded rod through a nut connected to the rod. The expansion shell held its grip until the threaded rod, which had a tensile strength of 60,000 lbs. per square inch, broke under the tension. The expansion shell had sufficient gripping strength to withstand tension great enough to break the threaded rod.

The expansion shall herewith described can be manufactured using a punch press with coil feed to produce the blank depicted in FIG. 1 and a punch press with transfer feed and five die units to form the finished shell depicted in FIG. 6 from the blank of FIG. 1. One person operating two typical punch presses can produce 2,000 shells per hour. An automatic screw machine is used to produce the threaded tapered plug; one person operating such a machine can produce 800 parts per hour. The relative ease of manufacture permits the expansion shells to be competitively priced with existing shells.

The embodiment described is an example of the present invention. The invention is not limited to this example, and there are other possible forms of construction within the scope and spirit of the invention.

I claim:

1. A metal, unitary bolt expansion shell of generally cylindrical shape, said shell comprising:
   (a) a pair of separate, arcuate leaves of semi-cylindrical cross-section, each of said leaves being longitudinally slotted through its central area and each of said leaves having a distal end and a proximal end;
   (b) a bail member interconnecting said leaves at the proximal ends thereof;
   (c) each of said leaves comprising a plurality of corrugations which are longitudinally compressed to lie one against another to form a plurality of pleated folds having a plurality of arcuate, approximately transverse ridges to provide an outer gripping surface of said expansion shell;
   (d) said pleated folds of said leaves increasing in amplitude from said proximal ends to said distal ends thereof whereby said leaves have thick distal ends and taper downwardly to thinner, proximal ends.

2. An expansion shell according to claim 1 wherein said leaves taper downwardly in width from the proximal end toward the distal end.

* * * * *